C. D. ANDERSON.
VEHICLE WHEEL.
APPLICATION FILED MAR. 30, 1906.
958,350.
Patented May 17, 1910.
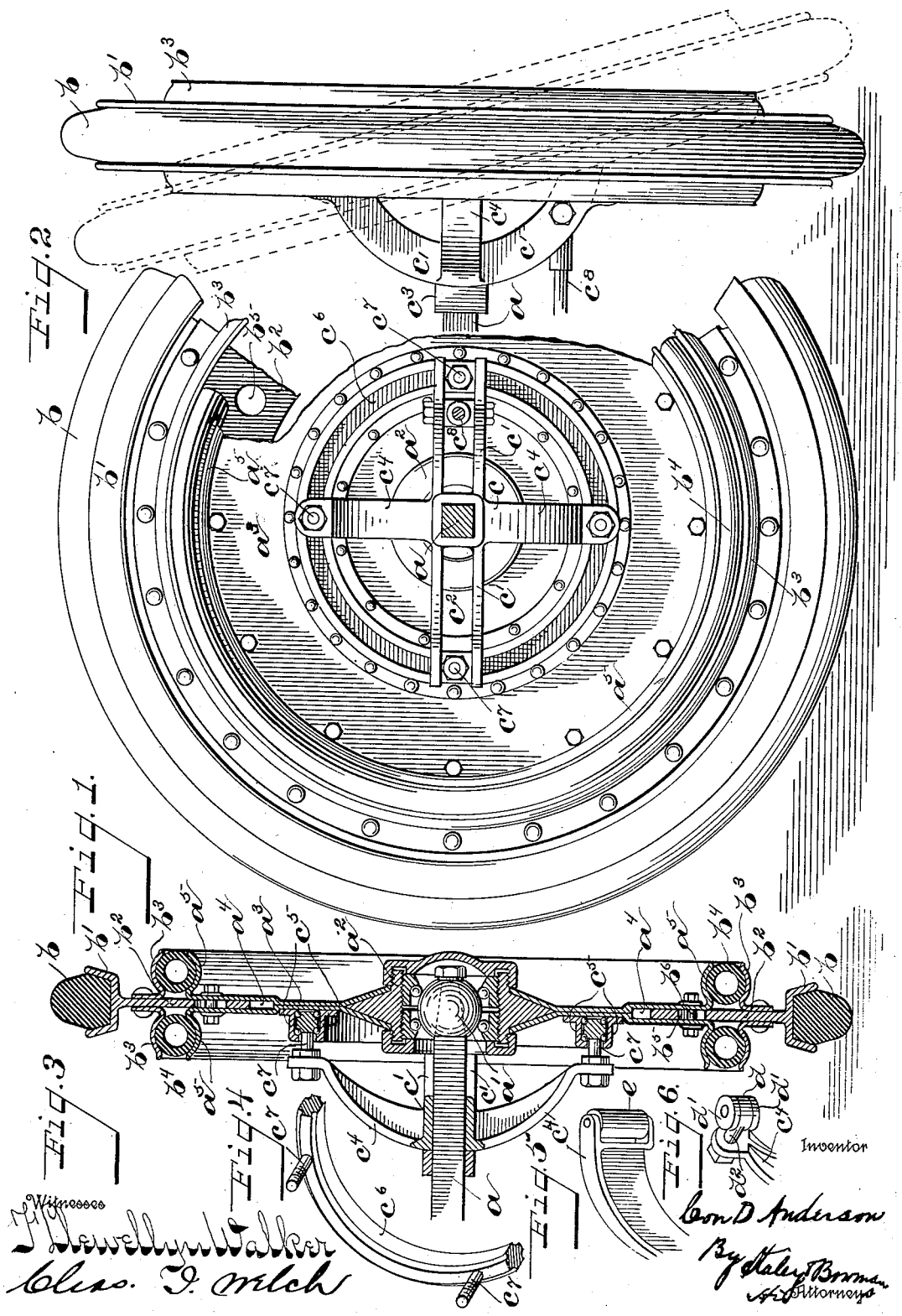

UNITED STATES PATENT OFFICE.

CON D. ANDERSON, OF LIMA, OHIO.

VEHICLE-WHEEL.

958,350.    Specification of Letters Patent.    Patented May 17, 1910.

Application filed March 30, 1906. Serial No. 308,859.

*To all whom it may concern:*

Be it known that I, CON D. ANDERSON, a citizen of the United States, residing at Lima, in the county of Allen and State of Ohio, have invented certain new and useful Improvements in Vehicle-Wheels, of which the following is a specification.

My invention relates to vehicle wheels, and particularly to wheels adapted for use with automobiles.

The object of the invention is to provide a construction wherein the wheel will readily respond to the steering mechanism under the influence of a minimum amount of power, and wherein the wheel will be turned upon its vertical axis in the steering operation.

With the above primary and other incidental objects in view, as will appear from the specification, my invention consists of the devices, parts, construction and mode of operation, or their equivalents, hereinafter described and set forth in the claims.

In the drawings, Figure 1 represents a side elevation of the wheel and the connection of the steering mechanism as it will appear from the inner side, or that adjacent to the vehicle. Fig. 2 is a plan view of the wheel showing in dotted lines the position of the wheel when moved for steering purposes. Fig. 3 is a vertical sectional view of the wheel. Figs. 4, 5 and 6 illustrate different methods of engagement between the steering mechanism and the wheel, as will be hereinafter described.

Like parts are indicated by similar characters of reference throughout the various views.

Referring by letter to the drawings, $a$ represents the front axle of the vehicle, carrying at its extremity a spherical bearing, $a'$. The spherical bearing, $a'$, may be formed either integral with the axle, $a$, or it may be separately formed and supported upon a trunnion or spindle forming a part of the axle, $a$, as shown in dotted lines in Fig. 3. The hub, $a^2$, of the vehicle wheel is preferably formed with suitable ball bearings, and is adapted to revolve about the sphere, $a'$. The engagement of the hub, $a^2$, with the sphere, $a'$, is such that in addition to the revolution of the wheel about the sphere, it is capable of being deflected in different angular planes during the time it is revolving, or is permitted a tipping or tilting movement, the hub and sphere forming a universal joint.

The main or central portion of the wheel consists of the hub, $a^2$, and a web, $a^3$, having therein a peripheral groove, $a^4$, and laterally projecting peripheral flanges $a^5$. It is obvious that in place of using the web, $a^3$, spokes might be employed, and a felly having the peripheral groove, $a^4$, and the flanges, $a^5$. About this main or central portion of the wheel is arranged an independent tread portion comprising a solid rubber tire, $b$, seated in a suitable channel, $b^1$, from which there projects an inward extending flange or web, $b^2$, projecting within the peripheral groove, $a^4$, of the central portion, as shown in Fig. 3. Extending laterally from the web, $b^2$, and corresponding in relation and contour to the flanges, $a^5$, are lateral wings or flanges, $b^3$. Intermediate the wings or flanges, $b^3$ and $a^5$, is located a resilient body or bodies, preferably pneumatic tubes, as shown at $b^4$.

Holes $b^5$, are formed in the web, $b^2$, at suitable intervals, and bolts, $b^6$, in the main portion of the wheel project through these openings, $b^5$, and serve to strengthen the periphery of the main portion and prevent the portions having the slot, $a^4$, from spreading when the wheel is subjected to undue strains or loads. It will be noted, however, that the openings, $b^5$, are of comparatively much greater diameter than that of the bolt, $b^6$, thus permitting the independent tread portion of the wheel a limited movement in any direction. It will be noted that by this construction the rim or tread portion of the wheel is capable of movement independent of the main portion of the wheel in a plane coincident therewith, and that any jar or vibration incident to the use of solid tires is absorbed or compensated for through the resiliency of the pneumatic tubes, $b^4$, while said tubes, $b^4$, are not subject to wear or liability to puncture.

In order to maintain the wheel in its vertical position, and to provide for deflecting the wheel laterally about its vertical axis, as shown in dotted lines in Fig. 2, means are provided as follows: There is mounted upon the axle, $a$, on the inner side of the wheel, a cruciform spider-like member, $c$, the vertical and horizontal arms of which engage the wheel at points intermediate its center and periphery and in perpendicular and horizontal alinement, respectively. The member, $c$, engages with the axle, $a$, at a point somewhat removed from the wheel. Through the horizontal arms, $c^1$ $c^1$, of the member, $c$, extends a continuous slot, $c^2$, through which protrudes the axle, $a$; the outlines of the horizontal arms, $c^1$, $c^1$, describe a true arc, as shown in Fig. 2, having its center coincident with the vertical axis of the wheel. A collar, $c^3$, is provided upon the axle, $a$, against which said arms, $c^1$, abut, and which provides a bearing therefor.

Extending perpendicularly from the arms, $c^1$, are additional arms, $c^4$. Various forms of connection between the respective arms, $c^1$ $c^4$, and the main portion of the wheel may be employed. In Fig. 3 there is shown a construction employing a recessed channel formed by two circular opposing L-shaped flanges, $c^5$ $c^5$. Within the recessed channel so formed is located a ring, $c^6$, preferably having at opposite sides ball races to provide a ball bearing for said ring within the channel mentioned. The ring, $c^6$, is provided at diametrically opposite points with studs, $c^7$, which engage the respective arms, $c^1$ $c^4$, of the member, $c$. The steering bar $c^8$ of the vehicle which may be reciprocated by any suitable steering mechanism in the usual manner, is pivotally connected to the arms, $c^1$. By this construction the wheel as it revolves about the axle, $a$, also revolves about the ring, $c^6$, which is stationary, and positively engaged by the member, $c$. Upon longitudinal movement of the steering bar, $c^8$, the member, $c$, will be oscillated about the imaginary center of the arc described, by the arm, $c^1$, which center, as before mentioned, is coincident with the vertical axis of the wheel. The slot, $c^2$, of the arm, $c^1$, permits this oscillating movement by permitting the arm, $c^1$, to move back and forth on opposite sides of the axle, $a$, in a horizontal direction, thus by its positive engagement with the ring, $c^6$, deflecting the wheel laterally about its vertical axis through the engagement of the ring, $c^6$, with the recessed channel formed by the flanges, $c^5$. The arm, $c^4$, remaining at all times perpendicular, maintains the wheel in its vertical position. It is obvious that in the place of the ring, $c^6$, a head, $d$, having at opposite sides rollers, $d^1$, $d^1$, might be connected with the respective arms, $c^1$ $c^4$, by a stud, $d^2$, corresponding to the stud, $c^7$, of the ring $c^6$. In this construction, as shown in Fig. 6, the head, $d$, with its rollers, $d^1$ $d^1$, would extend within the recessed channel formed by the flanges, $c^5$, and the rollers $d^1$ $d^1$ would engage the interior of said channel, and when deflecting the wheel by the movement of the member, $c$, as before described, the rollers, $d^1$, carried by one of the arms, $c^1$, would exert a pulling influence against the interior of the flanges, $c^5$, while the rollers, $d^1$, carried by the opposite arm, $c^1$, at a diametrically opposite point, would exert a pushing influence against the web, $a^3$.

In Fig. 5 is shown a further modification, in which a roller, $e$, may be secured at the extremity of the respective arms, $c^1$ $c^4$, the respective rollers, $e$, being arranged with their axis in radial relation to the wheel. In this construction the necessity of the flange, $c^5$, would be obviated, and the rollers, $e$, would engage the web, $a^3$, or in case spokes were employed they would engage a track secured upon the spokes. The rollers, $e$, at the ends of the respective arms would be mounted with their axes in radial relation to the wheel. Those rollers at the extremity of the arms, $c^4$, would continually engage the web, $a^3$, or the mentioned track, to maintain the wheel in its vertical position. Upon the movement of the steering apparatus, one of the rollers, $e$, carried by one of the arms, $c^1$, would exert a pushing influence upon the web, $a^3$, or the said track, to deflect the wheel about its vertical axis, while the corresponding roller would be idle, the roller thus exerting the pushing influence depending upon the direction in which it is desired to deflect the wheel.

From the above description, it will be apparent that there has been produced a vehicle wheel possessing the particular features of advantage hereinbefore enumerated as desirable, and which obviously is susceptible of modification in its proportions, detail construction and arrangement of parts, without departing from the principle involved or sacrificing any of its advantages.

Having thus described my invention, I claim:

1. In a device as described, an axle, a wheel having a ball-and-socket connection therewith, and a member consisting of four arms integrally formed thereon supported on said axle and engaging said wheel at diametrically opposite points, two of said arms being slotted to permit it to be moved with respect to said axle in a horizontal plane, substantially as specified.

2. In a structure as described, an axle, a wheel having a universal connection therewith, a device on said axle consisting of four projecting arms integrally formed therewith, the ends of two of which lie against said wheel to maintain the same in a vertical position, the other two of said arms being adapted to bear against said wheel on a horizontal line, said last-mentioned arms being slotted to permit the device and arms to swing in a horizontal plane, substantially as specified.

3. In a device as described, an axle, a wheel having a universal connection therewith, a slotted track about said wheel between the hub and periphery thereof, and a member supported on said axle consisting of four arms integrally formed therewith, two of said arms being vertically arranged and extending into said track at points diametrically opposite each other to maintain said wheel in a vertical direction, the other two of said arms being horizontally arranged and extending into said track at points diametrically opposite each other, said horizontally-arranged arms being slotted, substantially as and for the purpose specified.

In testimony whereof, I have hereunto set my hand this 24th day of March A. D. 1906.

CON D. ANDERSON.

Witnesses:
 MARSHALL A. PARKER,
 ALVIN MILLER.